United States Patent [19]
Igarashi

[11] Patent Number: 5,083,223
[45] Date of Patent: Jan. 21, 1992

[54] OBJECTIVE LENS SYSTEM FOR ENDOSCOPES

[75] Inventor: Tsutomu Igarashi, Tokyo, Japan

[73] Assignee: Olympus Optical Co., Ltd., Tokyo, Japan

[21] Appl. No.: 458,548

[22] Filed: Dec. 28, 1989

[30] Foreign Application Priority Data

Dec. 28, 1988 [JP] Japan .................. 63-329191

[51] Int. Cl.⁵ ............................................. G02B 13/18
[52] U.S. Cl. .................................... 359/708; 359/664
[58] Field of Search ............... 350/415, 416, 432, 469, 350/96.26

[56] References Cited

U.S. PATENT DOCUMENTS 4,354,734 10/1982 Nakahashi .
4,867,546 9/1989 Nishioka et al. .................... 350/432

FOREIGN PATENT DOCUMENTS 61-28965 7/1986 Japan .
61-162021 7/1986 Japan .

Primary Examiner—Paul M. Dzierzynski
Attorney, Agent, or Firm—Cushman, Darby & Cushman

[57] ABSTRACT

An objective lens system includes, in order from the object side, a first lens component whose image side surface has a positive power and a second lens component whose image side surface has a positive power, said objective lens system having a wide field angle and sufficiently small inclination angles of the principal ray at all image heights.

30 Claims, 11 Drawing Sheets

INCLINATION ANGLE OF EMERGING PRINCIPAL RAY

OBJECTIVE LENS SYSTEM FOR ENDOSCOPES

BACKGROUND OF THE INVENTION a) Field of the Invention

The present invention relates to an objective lens system for use in endoscopes having small outside diameters such as bronchoscopes.

b) Description of the Prior Art

Endoscopes, bronchoscopes and the similar scopes must have especially small outside diameters. For this reason, an objective lens system to be used in such endoscopes must also have a small outside diameter and cannot contain an image guide fiber bundle or solid-state image pickup device having many picture elements, whereby no strict restrictions are imposed on the imaging performance of the objective lens system. Accordingly, it is desired to use, in the above-mentioned type of endoscopes, objective lens systems which are advantageous in manufacturing and assembly of the lens components thereof, and lens systems having simple compositions, as exemplified by the objective lens system for endoscopes disclosed by U.S. Pat. No. 4354734, are selected in practice.

The above-mentioned objective lens system for endoscopes comprises a first lens component consisting of a cover glass and a plano-convex lens element which are cemented to each other with a stop interposed, and a second lens component consisting of a plano-convex lens element arranged so as to locate the convex surface thereof on the object side. This objective lens system is advantageous that it permits the utilization of the entire diameter of the lens system as the effective diameter allowing light to pass therethrough without being restricted by a spacer. It is unnecessary to interpose a spacer between the lens system and an image guide fiber bundle or a solid-state image pickup device when the second lens component, which is designed as the plano-convex lens element having a small diameter but easily manufacturable, is cemented to an image guide fiber bundle or a solid-state image pickup device. The second lens component having such a composition has the roll of a field lens and functions to prevent the principal ray from being inclined on the image surface when the exit pupil is located sufficiently far, i.e., when the objective lens system is so designed as to be a nearly telecentric lens system. This design serves to prevent loss of light quantity from being increased due to oblique incidence of the light bundle on the marginal portion of the image guide fiber bundle in fiber scopes.

In recent years where wide angles are demanded for the endoscopes such as bronchoscopes, field angles larger than 80° are mainly selected even in the field where endoscopes having thin diameters are applied. Accordingly, problems are posed by aberrations of pupil which are not problematic in the conventional objective lens systems having narrower field angles.

FIG. 1 illustrates a sectional view of the objective lens system, with the cover glass excepted, disclosed by U.S. Pat. No. 4354734, traced in which are passages of the rays emerging from the individual points on the image surface in parallel with the optical axis at an image height set so as to obtain a field angle of 120°.

This objective lens system has the numerical data listed below:

$r_2 = \infty$ $d_2 = 1.7157$ $n_2 = 1.883$ $v_2 = 40.78$ $r_3 = -1.7157$ $d_3 = 0.1667$ $r_4 = 1.6621$ $d_4 = 1.8318$ $n_3 = 1.883$ $v_3 = 40.78$ $r_5 = \infty$ $f = 1$ The numerical data listed above are different from those of the lens system disclosed by U.S. Pat. No. 4354734 and obtained by modifying the numerical data described as a preferred embodiment so as to obtain optimum aberrations within the range of the conditions described by U.S. Pat. No. 4354734.

The front focal point of this lens system is located at the position of the stop S shown in FIG. 1.

As is seen from the rays illustrated in FIG. 1, spherical aberration is at a degree posing little problem when image height is low and field angle is narrow. When image height is enhanced to widen field angle, however, the spherical aberration of the pupil abruptly increases thereby largely deviating the converging location of the rays having high image heights from the stop. Accordingly, the objective lens system is not completely telecentric for the rays having high image heights. This telecentricity is illustrated in FIG. 2, showing passages of the rays transmitted through the center of the stop arranged in the lens system having the numerical data listed above. As is clear from this drawing, the exit pupil for the paraxial ray is located at an infinite distance, whereas the exit pupil for the off axial ray for large image height is located in the vicinity of the image point under the influence of the the spherical aberration. For this reason, angle of emergence of the principal ray abruptly increases as image height enhances, thereby increasing loss of light quantity at the marginal portion of the image guide fiber bundle during transmission. Further, in an endoscope such as a non-flexible endoscope using a relay lens system, the pupil for an offaxial object point is not relayed to the side of the eyepiece lens and the off axial ray is eclipsed in the course of the relay lens system, thereby similarly increasing loss of light quantity at the marginal portion of image.

Furthermore, in case of an endoscope using a single color solid-state image pickup device, color shading is produced for the reason described above. Specifically, color filters are arranged on the surfaces of the individual picture elements of the single color solid-state image pickup device. These color filters are not in complete contact with photoelectric transducer elements of the image pick up device, and an airspace having a certain width remains between the filters and the transducer elements. Only the rays having passed through the filters should originally reach the photoelectric transducer elements but, when rays pass obliquely in practice, rays which have not passed through the filters reach the photoelectric transducer elements and degrade color reproducibility. Accordingly, the telecentricity is demanded not only for the objective lens system to be combined with an image guide fiber bundle but also for the objective lens system to be used with the single color solid-state image pickup device.

As an objective lens system having the composition similar to that of the objective lens system according to the present invention, there is known the Embodiment 7 of the lens system disclosed by Japanese Unexamined Published Patent Application No. 162021/61. This objective lens system is designed so as to correct distortion by using an aspherical surface and simultaneously correct the curvature of field produced by the aspherical surface with another aspherical surface. For this purpose, the objective lens system is designed so as to have functions for correcting distortion which are opposite to each other on both the sides of a stop. Specifically, the aspherical surface arranged before the stop has such a shape as to strengthen the positive refractive function (or weaken the negative refractive function) at the marginal portion of the lens, whereas the aspherical surface arranged after the stop has such a shape as to weaken the positive function (or strengthen the negative function). Accordingly, this objective lens system has a composition which is devided into a front lens unit and a rear lens unit with a stop interposed therebetween, and comprises at least one aspherical surface in each of the lens units.

The above-described objective lens systems for endoscopes comprising a stop in the vicinity of the front focal point thereof can hardly lower inclination of the principal ray emerging from the lens systems when the lens systems have large field angles, and have the above-described defects when used in endoscopes comprising image guides or solid-state image pickup devices.

SUMMARY OF THE INVENTION

A primary object of the present invention is to provide an objective lens system for endoscopes which is capable of sufficiently lowering inclination of the principal ray emerging from the lens system over the entire image surface even when the lens system has a large field angle.

The objective lens system for endoscopes according to the present invention comprises, in the order from the object side, a first lens component, a second lens component arranged on the image side of said first lens component with an airspace interposed and an aperture stop arranged on the object side of said airspace, both of the image side surface of said first lens component and the object side surface of said second lens component having positive refractive powers.

In a first type of the objective lens system according to the present invention, both of said image side surface and said object side surface are designed as spherical surfaces satisfying the following conditions (1) and (2):

$$0.21 < L/f < 0.5 \quad (1)$$

$$0.9 < f_2/f_1 21\ 3 \quad (2)$$

wherein the reference symbol L represents optical path length as measured from the front focal point of the objective lens system to the aperture stop, the reference symbol f designates focal length of the objective lens system as a whole, the reference symbol $f_1$ denotes focal length of the first lens component and the reference symbol $f_2$ represents focal length of the second lens component.

FIG. 5 shows a sectional view illustrating an example of this type of objective lens system. In this example, the first lens component I is a cemented doublet consisting of a cover glass C and a plano-convex lens element cemented to the cover glass with a stop S interposed, and the second lens component II consists of a single plano-convex lens element.

The condition (1) is required for lowering the inclination angle of the emerging principal ray at the maximum image height taking the spherical aberration of pupil into consideration. When only two lens surfaces have powers and these surfaces are designed as spherical surfaces as in the case of the lens system illustrated in FIG. 5, it is possible to control production of the spherical aberration of pupil to a certain degree. When the lens system has a large field angle, however, it is difficult to reduce absolute quantity of the spherical aberration of pupil. In order to lower the angle of emergence of the principal ray at a certain degree at all image heights, it is therefore sufficient to design the lens system so as to allow the ray to attain to the maximum image height to emerge at an angle of 0°. For this purpose, it is sufficient to shift the location of the stop from the front focal point toward the image side for a distance corresponding to the production quantity of the aberration. When this shifting distance, i.e., value of the above-mentioned optical path length L is selected within the range defined by the condition (1), the angle of emergence of the principal ray is lowered even at a field angle exceeding 90°.

If the lower limit of 0.21 of the condition (1) is exceeded, the emerging principal ray will be inclined toward the optical axis as image height is enhanced. If the upper limit of 0.5 of the condition (1) is exceeded, in contrast, the emerging principal ray will be inclined in the direction away from the optical axis. In either case, there will result in an undesirable effect to increase loss of light quantity in an image guide or a relay lens system, or to produce color shading in endoscopes using single color solid-state image pickup device.

The condition (2) is required for lowering inclination of the principal ray to attain to the intermediate image height when inclination of the principal ray to attain to the maximum image height is lowered, and obtaining adequate balance between the aberrations of pupil and the aberrations of image.

Even when inclination angle of the principal ray to attain to the maximum image height is lowered by satisfying the condition (1), the emerging rays are inclined since the imaginary front focal point of the principal ray to attain to the intermediate image height is located at a point different from the imaginary front focal point of the principal ray to attain to the maximum image height under the influence due to the spherical aberration of pupil as illustrated in FIG. 3. In FIG. 3, image height is taken as the ordinate, inclination angle of the principal ray is taken as the abscissa, and inclination toward the optical axis after emeragence is taken as positive. It is therefore necessary to reduce the absolute quantity of the spherical aberration of pupil for lowering inclination both at the maximum image height and the intermediate image height. Further, since this aberration is produced due to excessive refraction of the principal ray, the aberration results in increase of the barrel-shaped distortion in a lens system having such a simple composition as that of the objective lens system according to the present invention.

The condition (2) is adopted in view of the points described above and required for suppressing production of the aberrations of pupil by preventing the power of the second lens component from being not much higher than that of the first lens component. In other words, it is possible by designing a lens system so as to satisfy the condition (2) to obtain an objective lens system which dose not produce remarkable spherical aberration of the image, and has performance balanced entirely with regard to image and pupil.

If the lower limit of 0.9 of the condition (2) is exceeded, the second lens component will have too strong a power and the aberrations of pupil are aggravated, thereby increasing curvature of the graph illustrated in FIG. 3, making it difficult to lower inclination angles of the emerging principal ray at all the image heights and aggravating distortion. If the upper limit of 3 of the condition (2) is exceeded, the first lens component will have too strong a power and the spherical aberration of pupil is aggravated, thereby degrading imaging performance.

In order to correct aberrations more favorably in the objective lens system according to the present invention, it is desirable to use a glass material having a high refractive index for the plano-convex lens element and further design the lens system so as to satisfy the following condition (3):

(3) $d_3/f < 0.4$           (3)

wherein the reference symbol $d_3$ represents the airspace reserved between the spherical surface of the plano-covex lens element of the first lens component and the spherical surface of the plano-convex lens element of the second lens component.

When the objective lens system according to the present invention satisfies the condition (3), the lens system has a Petzval's sum which is not so large, and can suppress production quantities of the aberrations of image and the aberrations of pupil to the minimum degrees since the lens surfaces arranged therein can have low powers. Further, the satisfaction of the condition (3) provides another advantage to permit thickneninging of the lens elements or facilitate manufacturing of the lens elements.

In a second type of the objective lens system for endoscopes according to the present invention, an aspherical surface is adopted as the image side surface of the first lens component or the object side surface of the second lens component. The adoption of the aspherical surface makes it possible to obtain higher flexibility to control the spherical aberration of pupil, lower inclination angles of the principal ray at all the image heights and correct the spherical aberration of pupil more easily than that in the lens system comprising only the spherical surfaces.

An aspherical surface can generally be expressed by the following formula:

$$x = Cy^2/(1+\sqrt{1-P C^2 y^2}) + By^2 + Ey^4 + Fy^6 + Gy^8 + \ldots$$

wherein the reference symbols x and y represent coordinate values when the optical axis is taken as the abscissa, the direction toward the image is taken as positive, the intersection between the aspherical surface and the optical axis is taken as the origin, and the ordinate is set perpendicular to the abscissa, the reference symbol C designates an inverse number of the radius of the circle in contact with the aspherical surface on the optical axis, the reference symbol P denote the conical constant, and the reference symbols B, E, F, G, ... represent the aspherical surface coefficients of the second order, fourth order, sixth order, eighth order, ... respectively.

The above-mentioned formula expresses a spherical surface when P is equal to 1 and all of B, E, F, G, ... are zero.

The present invention has an object to obtain an objective lens system which has the aberrations of pupil corrected in the lens system arranged after the stop, and is different from the objective lens system disclosed by the above-mentioned Japanese Unexamined Published Patent Application No. 162021/61. When the objective lens system according to the present invention is divided into two sections taking the airspace reserved after the stop as a boundary, it is therefore necessary to correct the aberrations of pupil and the aberrations of image with good balance in the two sections respectively. It is desirable to arrange the aspherical surfaces for enhancing the flexibility in control of the aberrations of pupil as the surfaces of the first lens component and/or the second lens component having the positive powers. When an aspherical surface is arranged as the object side surface of the second lens component, it is desirable to design the surface as an aspherical surface which has a shape including portions having curvature progressively lowered as the portions are farther from the optical axis. "Curvature" means here an inverse number of radius of curvature on the spherical surface which is in contact, at a certain point on the curved surface, with said point and, in case of an aspherical surface, curvature at an optional point apart from the optical axis is different from the curvature on the optical axis.

Further, it is more desirable to design both the extremely image side surface of said first lens component and the extremely object side surface of said second lens component as aspherical surfaces which include portions having curvature progressively lowered as the portions are farther from the optical axis.

By arranging an aspherical surface on the second lens component or aspherical surfaces on both the first lens component and the second lens component, it is possible to correct the spherical aberration of the pupil more favorably. When the aspherical surface or surfaces are used as described above, however, it is more desirable to select values of $L/f$ and $f_2/f_1$ within the ranges defined by the following conditions (1') and (2') respectively;

$-0.5 < L/f < 0.3$           (1')

$0.5 < f_2/f_1 < 3$           (2')

The condition (1') is required for suppressing production of the spherical aberration of pupil. When an aspherical surface is arranged on the second lens component, it is possible to freely control the spherical aberration of pupil. In order to lower the inclination angle of the principal ray to attain to the maximum image height in this case, value of $L/f$ must be smaller than 0. When absolute value of $L/f$ is too large, however, the inclination angle of the principal ray to attain to the intermediate image height is undesirably large though the inclination angle of the principal ray to attain to the maximum image height is small. Therefore, value of $L/f$ should desirably be larger than the lower limit of $-0.5$ of the condition (1'). If the upper limit of 0.3 of the condition (1') is exceeded, however, the effect to use the aspherical surface(s) will be lost.

The condition (2') is required for balancing overall performance of the objective lens system.

In a lens system consisting only of spherical lens elements, power of the second lens component cannot be strengthened so much when the aberrations of pupil are taken into consideration and $f_2/f_1$ cannot have a small value. When an aspherical surface is used on the second lens component, however, it is possible to impart a strong power to the second lens component.

Values of $f_2/f_1$ can be reduced accordingly. If the value of $f_2/f_1$ is too small or smaller than 0.5, however, the offaxial aberrations of image cannot undesirably be corrected sufficiently after the spherical aberration of pupil is eliminated.

If the upper limit of 3 of the condition (2') is exceeded, in contrast, the first lens component will have too strong a power and the spherical aberration of image will be aggravated, thereby degrading the imaging performance.

Furthermore, in case of the objective lens system wherein the first lens component includes a spherical surface having a positive power and only the second lens component includes a spherical surface having the positive power, it is desirable to design the lens system so as to satisfy the following condition (4):

$$0.5 < d_2/|r_3| < 1.7 \qquad (4)$$

wherein the reference symbol $r_3$ represents radius of curvature on the image side surface of the first lens component and the reference symbol $d_2$ designates thickness of the plano-convex lens element arranged in the first lens component.

If the upper limit or the lower limit of the condition (4) is exceeded, the asymmetrical aberrations such as astigmatism and coma will undesirably be produced remarkably in the first lens component and cannot be corrected in the objective lens system as a whole.

It is more desirable to design the objective lens system so as to satisfy, in place of the condition (4), the following condition:

$$0.8 < d_2/|r_3| < 1.15$$

In the next place, in the case where aspherical surfaces are used on both the first lens component and the second lens component, it is desirable to design the objective lens system so as to satisfy the following condition (5):

$$0.6 < d_2/|r'_3| < 2 \qquad (5)$$

wherein the reference symbol $r'_3$ represents the radius of curvature on the optical axis of the convex surface of the first lens component or the value given by the following formula when the aspherical surface is represented by the aspherical surface coefficient of the second order B only or by a combination of B and C:

$$r'_3 = 1/(2B + C)$$

If the upper limit or the lower limit of the condition (5) is exceeded, the asymmetrical aberrations such as astigmatism and coma will undesirably be produced too remarkably in the first lens component and cannot be corrected in the objective lens system as a whole.

It is more desirable to limit $d_2/r'_3$ within the range defined below:

$$1.2 < d_2/|r'_3| < 1.5$$

Further, it is possible to suppress the spherical aberration of the pupil in the objective lens system according to the present invention by using an aspherical surface only as the convex surface (the image side surface) of the first lens component. In this case also, it is sufficient that the aspherical surface has a shape including portions having curvature progressively lowered as the portions are farther from the optical axis. Also in the case where an aspherical surface is arranged only on the first lens component as described above, it is desirable for maintaining the telecentricity to satisfy the following condition (1') for the same reason as for the case where the aspherical surface is arranged also on the second lens component:

$$-0.5 < L/f < 0.3 \qquad (1')$$

In order to correct the other aberrations simultaneously, it is desirable to design the objective lens system according to the present invention so as to further satisfy the following conditions (2''), (5'') and (3''):

$$1 < f_2/f_1 < 6 \qquad (2'')$$

$$1 < d_2/|r'_3| < 3 \qquad (5')$$

$$d_3/f < 0.3 \qquad (3')$$

If $f_2/f_1$ has a value smaller than the lower limit of the condition (2''), it will undesirably be difficult to correct the spherical aberration of pupil and distortion. If $f_2/f_1$ has a value larger than the upper limit of the condition (2''), the spherical aberration will undesirably be aggravated, thereby making it necessary to enlarge F number.

If $d_2/|r'_3|$ has a value exceeding the upper limit or the lower limit of the condition (5'), astigmatism and coma will undesirably be aggravated when the spherical aberration of pupil is corrected sufficiently.

The condition (3') is required for correcting distortion. In order to correct distortion while maintaining the telecentricity in the objective lens system according to the present invention, it is preferable to select a value as large as possible for $f_2/f_1$ so that the surface having the power of the second lens component is brought close to the image surface while enhancing power of the first lens component.

The aberration coefficients of distortion are greatly influenced the height of the principal ray and dependent also on the marginal ray. The surface which is located near the image surface and has sufficiently low height for the marginal ray to banly influence on distortion. Accordingly, it is possible to reduce distortion in the objective lens system as a whole by locating the convex surface of the second lens component producing the negative distortion farther from the convex surface of the first lens component.

If $d_3/f$ has a value smaller than the lower limit of the condition (3'), the distortion will undesirably be corrected insufficiently.

In the objective lens system according to the present invention, the stop may be arranged on the plane surface of the plano-convex lens element used in the first lens component or at a location apart from said plane surface toward the object side as illustrated in FIG. 4. Further, the surface of the first lens component located on the side of the stop may not be a plane surface for accomplishing the object of the present invention, but may be of any type so long as said surface satisfies the above-mentioned conditions.

DETAILED DESCRIPTION OF THE PREFERRED EMBODIMENTS

Figure 1:
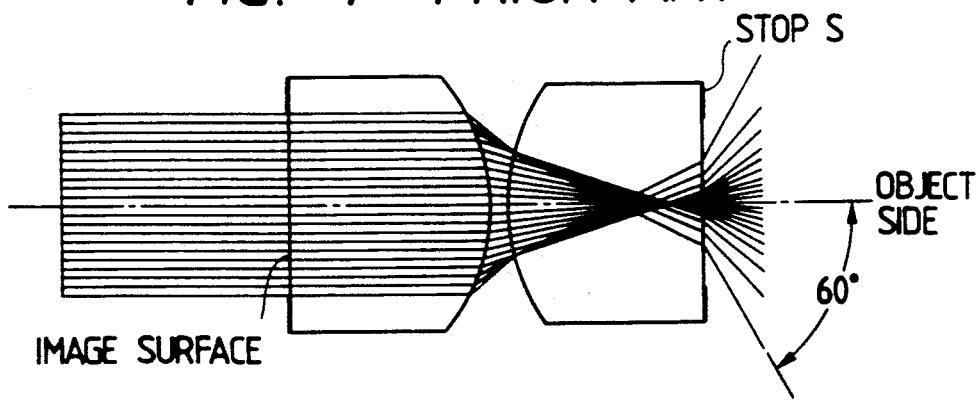
FIG. 1 and FIG. 2 show sectional views illustrating the conventional objective lens system for endoscopes.
Figure 2:
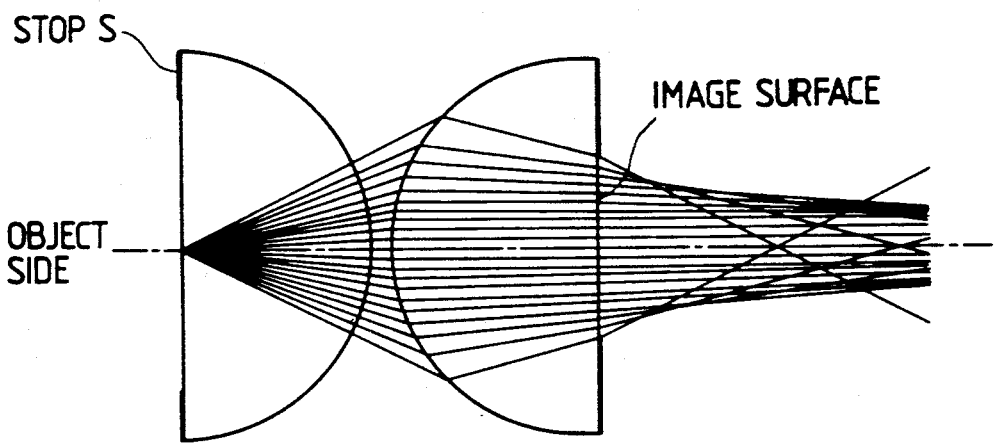
Figure 3:
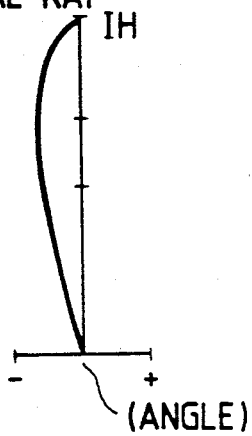
FIG. 3 shows a curve illustrating inclination angle of the emerging principal ray.

Now, the present invention will be described in more detail with reference to the preferred Embodiments illustrated in the accompanying drawings and given in the form of the following numerical data:

Embodiment 1

$f=1.000$, $F/2.031$, $2\omega=100°$
$IH=0.7311$, object distance $=-20,0000$
$r_1=\infty$
 $d_1=0.6000$ $n_1=1.88300$ $v_1=40.78$
$r_2=\infty$ (stop)
 $d_2=1.0910$ $n_2=1.88300$ $v_2=40.78$
$r_3=-1.7456$
 $d_3=0.2000$
$r_4=1.6059$
 $d_4=1.7865$ $n_3=1.88300$ $v_3=40.78$
$r_5=\infty$
 $|L/f|=0.311$, $f_2/f_1=|r_4/r_3|=0.92$

Embodiment 2

$f=1.000$, $F/2.040$, $2\omega=120°$.
$IH=0.8225$, object distance $=-20.0000$
$r_1=\infty$
 $d_1=0.6000$ $n_1=1.88300$ $v_1=40.78$
$r=\infty$ (stop)
 $d_2=0.9196$ $n_2=1.88300$ $v_2=40.78$
$r_3=-1.6722$
 $d_3=0.2000$
$r_4=1.6722$
 $d_4=1.7781$ $n_3=1.88300$ $v_3=40.78$
$r_5=\infty$
 $|L/f|=0.406$, $f_2/f_1=|r_4/r_3|=1$

Embodiment 3

$f=1.000$, $F/2.023$, $2\omega=120°$
$IH=0.9063$, object distance $=-20.0000$
$r_1=\infty$
 $d_1=0.6012$ $n_1=1.88300$ $v_1=40.78$
$r_2=\infty$ (stop)
 $d_2=1.3082$ $n_2=1.88300$ $v_2=40.78$
$r_3=-1.3978$
 $d_3=0.2004$
$r_4=2.0967$
 $d_4=1.7392$ $n_3=1.88300$ $v_3=40.78$
$r_5=\infty$
 $|L/f|=0.221$, $f_2/f_1=|r_4/r_3|=1.5$

Embodiment 4

$f=1.000$, $F/2.026$, $2\omega=140°$
$IH=1.0104$, object distance $=-20.0000$
$r_1=\infty$
 $d_1=0.6006$ $n_1=\mathbf{1.88300}$ $v_1=40.78$
$r_2=\infty$ (stop)
 $d_2=1.3012$ $n_2=1.88300$ $v_2=40.78$
$r_3=-1.3342$
 $d_3=0.2004$
$r_4=2.2681$
 $d_4=1.7277$ $n_3=1.88300$ $v_3=40.78$
$r_5=\infty$
 $|L/f|=0.231$, $f_2/f_1=|r_4/r_3|=1.7$

Embodiment 5

$f=1.000$, $F/2.000$, $2\omega=120°$
$IH=1.1378$, object distance $=-20,0000$
$r_1=\infty$
 $d_1=0.7644$ $n_1=1.88300$ $v_1=40.78$
$r_2=\infty$ (stop)
 $d_2=1.2552$ $n_2=1.88300$ $v_2=40.78$
$r_3=-1.2552$
 $d_3=0.6277$
$r_4=1.6626$ (aspherical surface)
 $d_4=1.1437$ $n_3=1.88300$ $v_3=40.78$
$r_5=\infty$
aspherical surface coefficients
$P=-2.5456$
$L/f=0$, $f_2/f_1=1.325$, $-(d_2/r_3)=1$
$(d_2+d_3)/f_2=1$

Embodiment 6

$f=1.000$, $F/2.335$, $2\omega=120°$
$IH=1.2913$, object distance $=-20.0000$
$r_1=\infty$
 $d_1=0.8675$ $n_1=1.88300$ $v_1=40.78$
$r_2=\infty$ (stop)
 $d_2=1.3523$ $n_2=1.88300$ $v_2=40.78$
$r_3=-1.3523$
 $d_3=0.5315$
$r_4=\mathbf{0.9727}$ (aspherical surface)
 $d_4 1.0650$ $n_3=1.51633$ $v_3=64.15$
$r_5=\infty$
aspherical surface coefficients
$P=-1.2993$
$L/f=0$, $f_2/f_1=1.393$, $-(d_2/r_3)=1$
$(d_2+d_3)/f_2=1$

Embodiment 7

$f=1.000$, $F/2.003$, $2\omega=120°$
$IH=1.1299$, object distance $=\mathbf{-20.0000}$
$r_1=\infty$
 $d_1=0.7591$ $n_1=1.88300$ $v_1=40.78$
$r_2=\infty$ (stop)
 $d_2=1.1798$ $n_2=1.88300$ $v_2=40.78$
$r_3=-1.2525$
 $d_3=0.6346$
$r_4=1.6541$ (aspherical surface)
 $d_4=1.1330$ $n_3=1.88300$ $v_3=40.78$
$r_5=\infty$
aspherical surface coefficients
$P_4=1.0000$, $E_4=-0.16340$
$F_4=0.10870$, $G_4=-0.38057\times10^{-1}$
$L/f=0.035$, $f_2/f_1=1.321$
$-(d_2/r_3)=0.942$, $(d_2+d_3)/f_2=0.969$

Embodiment 8

$f=1.000$, $F/2.006$, $2\omega=120°$
$IH=1.1424$, object distance $=\mathbf{-20.0000}$
$r_1=\infty$
 $d_1=0.7675$ $n_1=1.88300$ $v_1=40.78$
$r_2=\infty$ (stop)
 $d_2=1.4845$ $n_2=1.88300$ $v_2=40.78$
$r_3=-1.1544$ (aspherical surface)
 $d_3=0.7019$
$r_4=1.7406$ (aspherical surface)

$d_4 = 0.9638$  $n_3 = 1.88300$  $\nu_3 = 40.78$
$r_5 = \infty$
aspherical surface coefficients
$P_3 = 1.0000$, $E_3 = -0.015198 \times 10^{-1}$
$F_3 = 0.31605 \times 10^{-1}$, $G_3 = 0.50240 \times 10^{-1}$
aspherical surface coefficients
$P_4 = 1.0000$, $E_4 = -0.63804 \times 10^{-1}$
$F_4 = 0.25671 \times 10^{-2}$, $G_4 = -0.65556 \times 10^{-2}$
$L/f = -0.144$, $f_2/f_1 = 1.508$
$-(d_2/r_3) = 1.286$, $(d_2+d_3)/f_2 = 1.109$ Embodiment 9

$f = 1.000$, $F/1.992$, $2\omega = 120°$
$IH = 1.0912$, object distance $= -20.0000$
$r_1 = \infty$
 $d_1 = 0.7331$  $n_1 = 1.88300$  $\nu_1 = 40.78$
$r_2 = \infty$ (stop)
 $d_2 = 1.4544$  $n_2 = 1.88300$  $\nu_2 = 40.78$
$r_3 = -1.1203$ (aspherical surface)
 $d_3 = 0.6803$
$r_4 = 1.9308$ (aspherical surface)
 $d_4 = 0.9692$  $n_3 = 1.88300$  $\nu_3 = 40.78$
$r_5 = \infty$
aspherical surface coefficients
$P_3 = 1.0000$, $E_3 = -0.12612 \times 10^{-1}$
$F_3 = 0.38562 \times 10^{-1}$, $G_3 = 0.63516 \times 10^{-1}$
aspherical surface coefficients
$P_4 = 1.0000$, $E_4 = -0.90575 \times 10^{-1}$
$F_4 = 0.11785 \times 10^{-1}$, $G_4 = 0.42079 \times 10^{-2}$
$L/f = -0.084$, $f_2/f_1 = 1.723$
$-(d_2/r_3) = 1.298$, $(d_2+d_3)/f_2 = 0.976$ Embodiment 10

$f = 1.000$, $F/1.983$, $2\omega = 140°$
$IH = 1.3506$, object distance $= -20.0000$
$r_1 = \infty$
 $d_1 = 0.9093$  $n_1 = 1.88300$  $\nu_1 = 40.78$
$r_2 = \infty$ (stop)
 $d_2 = 1.5846$  $n_2 = 1.88300$  $\nu_2 = 40.78$
$r_3 = -1.2763$ (aspherical surface)
 $d_3 = 0.6352$
$r_4 = 1.6087$ (aspherical surface)
 $d_4 = 1.1334$  $n_3 = 1.88300$  $\nu_3 = 40.78$
$r_5 = \infty$
aspherical surface coefficients
$P_3 = 1.0000$, $E_3 = -0.28590 \times 10^{-1}$
$F_3 = 0.16884 \times 10^{-1}$, $G_3 = 0.26784 \times 10^{-1}$
aspherical surface coefficients
$P_4 = 1.0000$, $E_4 = -0.72682 \times 10^{-1}$
$F_4 = -0.29955 \times 10^{-2}$, $G_4 = -0.49935 \times 10^{-2}$
$L/f = -0.190$, $f_2/f_1 = 1.260$
$-(d_2/r_3) = 1.241$, $(d_2+d_3)/f_2 = 1.218$ Embodiment 11

$f = 1.000$, $F/2.701$, $2\omega = 120°$
$IH = 1.0679$, object distance $= -20.0000$
$r_1 = \infty$
 $d_1 = 0.5252$  $n_1 = 1.51633$  $\nu_1 = 64.15$
$r_2 = \infty$ (stop)
 $d_2 = 1.5336$  $n_2 = 1.88300$  $\nu_2 = 40.78$
$r_3 = -0.9570$ (aspherical surface)
 $d_3 = 0.7705$
$r_4 = 3.3154$
 $d_4 = 0.6371$  $n_3 = 1.88300$  $\nu_3 = 40.78$
$r_5 = \infty$
aspherical surface coefficients
$P_3 = 0.3031$
$L/f = -0.020$, $d_3/f = 0.7705$, $f_2/f_1 = 3.464$
$-(d_2/r_3) = 1.603$, $(d_2+d_3)/f_2 = 0.614$ wherein the reference symbols $r_1, r_2 \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2 \ldots$ denote refractive indices of the respective lens elements, and the reference symbols $\nu_1, \nu_2, \ldots$ represent Abbe's numbers of the respective lens elements.

Of the preferred Embodiments described above, Embodiments 1 through 4 have the compositions illustrated in FIG. 5 through FIG. 8 respectively and comprise spherical surfaces only. Each of these Embodiments can satisfy the conditions (1, (2) and (3), and accomplish the object of the present invention.

Figure 9:
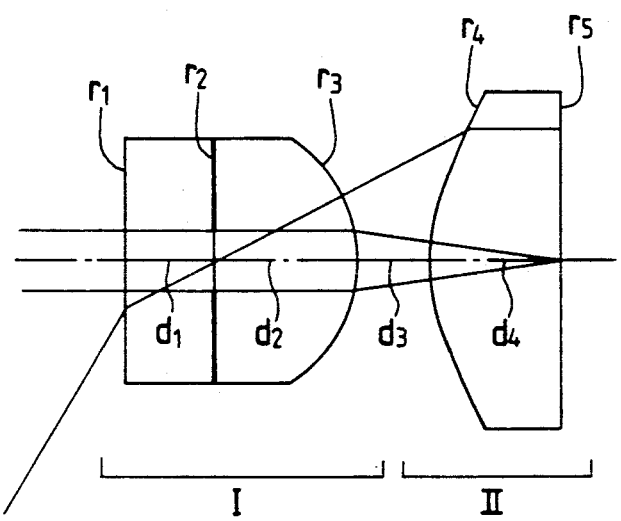

Embodiment 5 has the composition illustrated in FIG. 9 wherein the greatest influence is on the aberrations of pupil by the convex surface of the second lens component. For this reason, this surface is designed as an aspherical surface for eliminating the spherical aberration of pupil. Further, the first lens component is designed as a plano-convex lens element having a spherical surface and the stop is arranged at the central position of the spherical surface. In addition, the second lens component is designed as a plano-convex lens element having a . convex hyperbolic surface. Since the center of the stop is located at an aplanatic point of the spherical surface of the first lens component in the lens system, no spherical aberration of pupil is produced by the aspherical surface in the Embodiment 5. The aspherical surface coefficient of the second order B and the aspherical surface coefficients of higher orders are set at 0, and $P < 0$ is selected for the hyperbolic surface of the second lens component. The hyperbolic surface is therefore expressed by the following formula:

$$X = Cy^2/(1 + \sqrt{1 - pC^2y^2})$$

When $P = 1 - n_4$ is adopted in the above-mentioned formula, it is possible by selecting a glass material having a refractive index of $n_4$ for the second lens component, to completely eliminate spherical aberration regardless the of height of the ray for an object located on the side of the plane surface of the plano-convex lens element.

Embodiment 5 comprises the first lens component having the aplanatic surface and the second lens component designed as the plano-convex lens element having the aspherical surface producing no spherical aberration, and completely eliminates inclination of the principal ray owing to the fact that the front focal point is made coincident with the location of the stop by designing the objective lens system so as to satisfy the following formula, completely eliminate the spherical aberration of pupil and locates the exit pupil at infinite distance at all the image heights:

$(d_2+d_3)/f_2 = 1$ wherein the reference symbol $d_2$ represents thickness of the plano-convex lens element arranged in the first lens component, the reference symbol $d_3$ designates the airspace reserved between the first lens component and the second lens component, and the reference symbol $f_2$ denotes focal length of the second lens component.

Further, distortion is also corrected favorably in Embodiment 5. In a telecentric optical system consisting only of spherical lens elements, distortion at the maximum image height is approximated as $100(1 \cos\omega)(\%)$ at a half field angle of $\omega$, and is $-50\%$ at a half field angle of $60°$.

Embodiment 5 is designed for a half field angle of 60° and has distortion of −33.7% at the maximum image height which is lower than the distortion in an objective lens system consisting only of spherical lens elements. This is owing to the fact that Embodiment 5 uses the aspherical surface on the second lens component which lowers curvature on the convex surface of the second lens component as the surface portions are farther from the optical axis and therefore permits the setting of an image height higher than that in an objective lens system having the same field angle and focal length as those of Embodiment 5 and consisting only of spherical lens elements.

Embodiment 5 favorably corrects not only the aberrations of the pupil but also the aberration of image as described above.

As for the spherical aberration in Embodiment 5, it is considered to be similar to that in the Embodiments consisting only of the spherical lens elements since height of the marginal ray passing through the convex surface of the second lens component is low and the marginal ray is barely influenced by adopting the aspherical surface in Embodiment 5. Accordingly, it is sufficient for preventing aggravation of the spherical aberration to avoid imparting too strong a power to the first lens component as compared with that of the second lens component. Embodiment 5 is designed so as to avoid imparting too strong a power to the first lens component by selecting $f_2/f_1 = 1.325$.

Astigmatism and coma are influenced by the aspherical surface adopted on the convex surface of the second lens component. In the composition of the objective lens system according to the present invention wherein the stop is mostly located in the vicinity of the center of curvature on the convex surface of the first lens component, however, astigmatism and coma are barely produced by this convex surface. In contrast, the convex surface of the second lens component ordinarily has a positive Seidel's coefficient of the third order, and tends to over-correct astigmatism and coma. For this reason, an optical system comprising no aspherical surface is mostly designed so as to suppress curvature of an average image surface by utilizing the fact that the meridional image surface is located on the positive side of the sagittal image surface. However, such a design produces a tendency to aggravate astigmatism and over-correct coma, i.e., to produce the outer coma.

In Embodiment 5 wherein the aspherical surface is used on the convex surface of the second lens component for correcting the aberrations of pupil, the aspherical surface has also a function advantageous for correcting astigmatism and coma. Since this aspherical surface has a tendency to weaken curvature as the surface portions are farther from the optical axis, the aspherical surface can weaken the tendency to overcorrect astigmatism and coma at high image heights. Accordingly, Embodiment 5 does not allow astigmatism to be aggravated so much at high image heights, maintains sufficiently low curvature for the average surface of the sagittal image surface and the meridional image surface, and corrects coma favorably.

Figure 10:
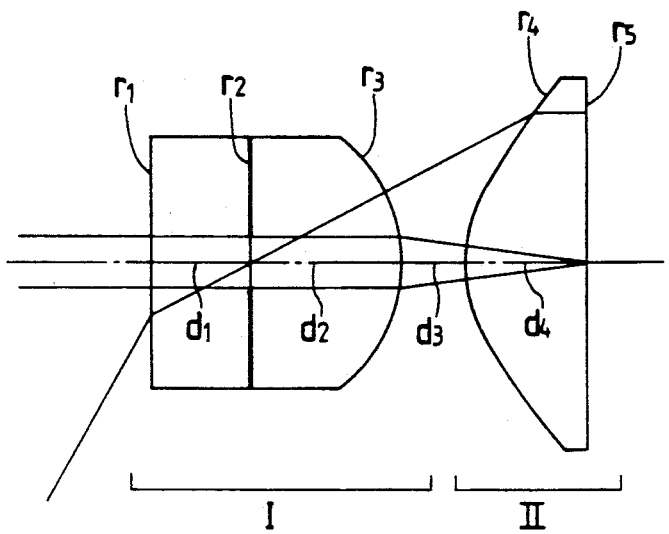

Embodiment 6 has the composition illustrated in FIG. 10 and similar to that of the Embodiment 5, but selects a low refractive index for the aspherical plano-convex lens element of the second lens component. Embodiment 6 has distortion of −24.7% at $\omega = 60°$ which is corrected more favorably than the distortion in Embodiment 5. This is owing to the fact that angle of incidence of the principal ray must be enlarged on the second lens component for which a low refractive index is selected and the principal ray is refracted accordingly by the lens surface portions having large values of x in the formula expressing the aspherical surface, thereby enhancing heights of the ray. When the lens component having the function of the field lens is designed so as to have an aspherical surface, it is possible to correct remarkable distortion by selecting a lower refractive index for the lens component. However, since the surface portions having high asphericalities are used for the correction, astigmatism is produced at degrees different between the portions having high image heights and the portions having low image heights, and the meridional image surface is swollen on the positive side at a higher tendency at intermediate image heights.

Figure 11:
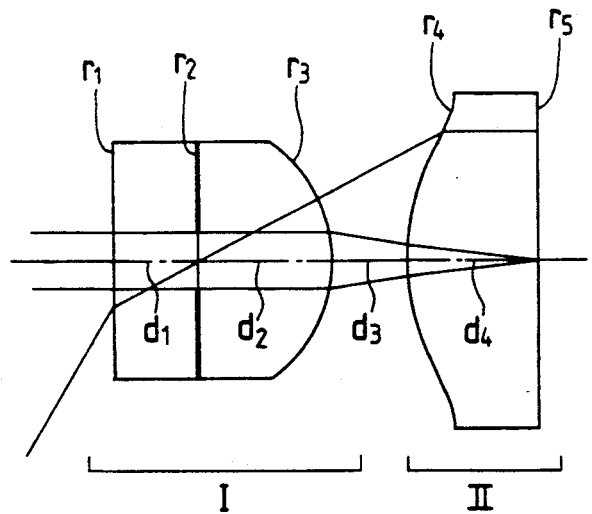

Embodiment 7 has the composition illustrated in FIG. 11 which is fundamentally similar to that of Embodiment 5. Specifically, the stop is arranged in the vicinity of the center of curvature on the convex surface of the first lens component but, in Embodiment 7, the convex surface of the second lens component is designed not as a hyperbolic surface but as an aspherical surface which is expressed by an optional polynominal, has a nearly hyperbolic surface within the effective diameter thereof and has curvature lowered as the surface portions are farther from the optical axis. This is because Embodiment 7 requires no complete elimination of the aberrations of pupil at all the image heights. In other words, inclination of the principal ray is not enhanced so remarkably when the spherical aberration of pupil is produced at a certain degree at the low image heights in Embodiment 7, whereby curvature on the aspherical surface of the second lens component may not always be lowered as the surface portions are farther from the optical axis so long as the curvature of the portion of the aspherical surface through which the principal ray passes is lower than that on the optical axis without fail.

When it is desired to correct distortion at the same time, however, the aspherical surface coefficient of the fourth order $E_4'$ in the formula expressing the aspherical surface of the second lens component should desirably be within the range defined by the following condition:

$$E_4' \cdot f^3 < -0.09$$

wherein the reference symbol $E_4'$ represents the aspherical surface coefficient in the formula transformed from the above-mentioned formula of aspherical surface so as to obtain $P = 1$ and $B = 0$. When $B_4$ and $E_4$ are zero respectively in the formula expressing the aspherical surface, for example, $E_4' \neq 0$ deriving from $P \neq 1$ is expressed as follows:

$$E_4' = 0.125(P_4 - 1)/r_4^3$$

Further, when $B_4$ is not zero, a paraxial radius of curvature can be determined newly from $B_4$ and $C_4$, and $E_4'$ can be calculated on the basis of the determined paraxial radius of curvature.

Figure 12:
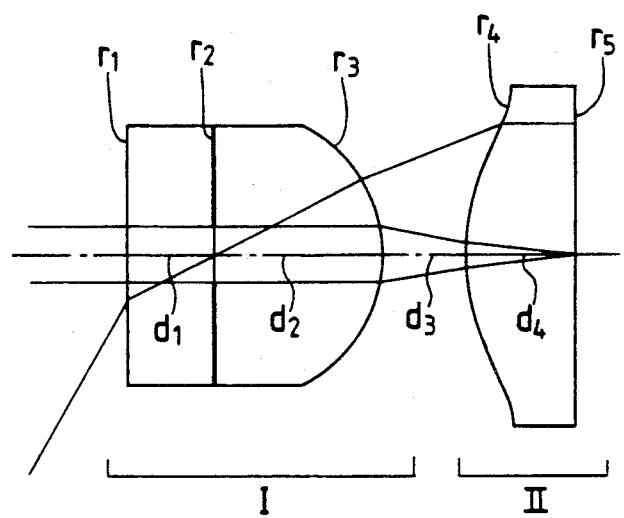
Figure 13:
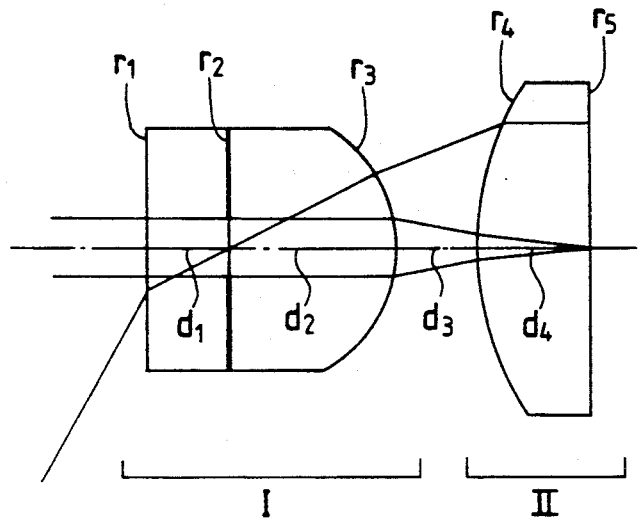
Figure 14:
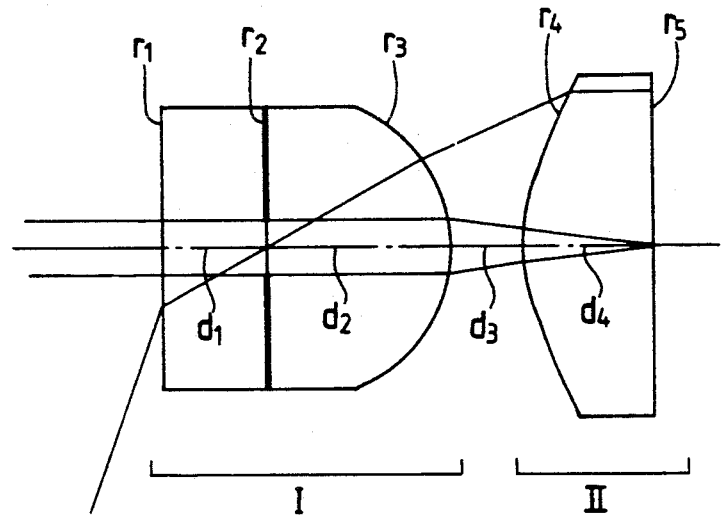

Embodiments 8 through 10 have the compositions illustrated in FIG. 12 through FIG. 14 respectively. In each of these Embodiments, aspherical surface are used not only on the convex surfaces of the second lens component but also on the convex surface of the first lens component.

Also in these Embodiments, the aberrations of pupil are influenced mainly by the convex surface of the second lens component. Accordingly, this surface has such a shape as to lower curvature on the portions apart from the optical axis, allowing actual passage of rays as opposed to that on the optical axis. This design to adopt the aspherical surface on the convex surface of the second lens component produces a tendency to allow the meridional image surface to be swollen on the positive side. When this tendency is enhanced, the meridional image surface will undesirably allow abrupt variation of the meridional image surface. For this reason, this tendency is lowered by adopting the aspherical surface on the convex surface of the first lens component.

The aspherical surface of the second lens component has a function to overcorrect astigmatism of the rays to attain low image heights and another function to lower the degree of overcorrection of astigmatism of the rays to attain high image heights. In order to bring the meridional image surface as a whole close to the paraxial image surface by suppressing the swelling of the meridional image surface, it is therefore sufficient to design the first lens component in such a manner that the portions undercorrect astigmatism of the rays a little to attain to low image heights and the portions a overcorrect astigmatism of the rays a little to attain high image heights. It is possible to produce a tendency to undercorrect astigmatism of the rays to attain low image heights by displacing the location of the stop in either direction from the center of curvature on the convex surface of the first lens component. Further, in order to produce a tendency to overcorrect astigmatism of the rays to attain high image heights by designing the convex surface of the first lens component as an aspherical surface, it is necessary to lower curvature on the portions apart from the optical axis. When the location of the stop is displaced from the center of curvature on the convex surface of the first lens component for this purpose, it is preferable to displace the location of the stop in the direction to establish the following relationship:

$$d_2/|r_3| < 1$$

wherein the reference symbol $r_3$ represents the radius of curvature on the convex surface of the first lens component and the reference symbol $d_2$ designates the thickness of the plano-convex lens element. By displacing the location of the stop as described above and adopting on the convex surface the aspherical surface having the curvature lowered at the portions apart from the optical axis, it is possible to suppress the swelling of the meridional image surface and bring the meridional image surface as a whole close to the paraxial image surface. The aspherical surface adopted on the first lens component need not have the shape which always lowers curvature as the surface portions are farther from the optical axis, but may be designed as an aspherical surface which inversely enhances curvature at the portion through which the principal ray to attain the intermediate image height passes so as to increase the tendency of undercorrection of astigmatism at the intermediate image height. However, the portion through which the principal ray to attain the maximum image height passes must have curvature lower than that on the optical axis.

The aspherical surface of the first lens component having the above-described shape should desirably have the coefficients of the fourth order and the sixth order in the formula of aspherical surface satisfying the following conditions respectively:

$$E_3' \leq 0$$

$$F_3' > 0$$

wherein the reference symbols $E_3'$ and $F_3'$ represent the aspherical surface coefficients of the fourth order and the sixth order respectively in the formula derived from the above-mentioned formula of aspherical surface by transforming it so as to obtain $P=1$ and $B=0$. In case of $P_3 \neq 1$ and $B_3 \neq 0$, for example, $E3'$ and $F3'$ are given by the following formulae:

$$E_3' = 0.125(P_3-1)/r_3^3 + E_3$$

$$F_3' = 0.0625(P_3^2-1)/r_3^5 + F_3$$

Further, in case of $B_3 \neq 0$, $E_3'$ and $F_3'$ can be determined on the basis of a radius of curvature on the optical axis which is newly calculated from $B_3$ and $C_3$.

When the convex surface of the first lens component is designed as an aspherical surface satisfying $E_3' < 0$ and $F_3' > 0$, it is possible to balance aberrations between the first lens component and the second lens component by designing the aspherical surface on the second lens component so as to have the aspherical surface coefficients of the fourth order $E_4'$ satisfying the following condition:

$$E_4' \cdot f^3 < -0.01$$

When the aspherical surfaces are used not only on the second lens component but also on the first lens component as in the cases of Embodiments 8 through 10 described above, it is desirable to design the objective lens system according to the present invention so as to satisfy the condition (5) as already described above, and Embodiments 8 through 10 satisfy this condition.

Taking into consideration Petzval's sum, spherical aberration produced by the first lens component, aberrations of the off axial rays passing through the marginal portions of pupil and so on, refractive index of the plano-convex lens element arranged in the first lens component of the objective lens system according to the present invention should desirably be at least 1.65. This value of Petzval's sum has no relation to whether the first lens component is a spherical lens or an aspherical lens.

When the aspherical surface is used on the second lens component as in the cases of Embodiments 5 through 10, it is desirable that the aspherical surface has asphericality high enough to correct the aberrations of pupil up to the maximum image height. In order to obtain a sufficiently wide field angle, it is necessary, to take the refractive power of the first lens component for the principal ray into consideration to select the numerical aperture of an imaginary pupil of at least 0.5 for the second lens component. For this purpose, it is sufficient for the shape of the aspherical surface adopted on the second lens component to have a value of y in the formula expressing aspherical surface normalized to the power of the aspherical surface $(y_4(n_4-1)/r_4')$ which has sufficiently high asphericality at a numerical aperture of 0.5. The reference symbol $r_4'$ represents a radius of curvature on the aspherical surface of the second lens component calculated in terms of that on the optical axis as follows:

$$r_4' = 1/2B_4 + C_4$$

Further, degree of asphericality $\Delta \times_4$ has the value defined by the following formula:

$$\Delta \times_4 = \times_4 - (y^2/r_4'^2) / 1 + \sqrt{1 - P(y/r_4')^2})$$

It is sufficient that the value of $\Delta \times_4$ normalized to the power of the aspherical surface $(\Delta \times_4(n_4-1) / r_4')$ satisfies the following formula when $y_4(n_4-1) / r_4' = 0.5$:

$$\Delta \times (n-1) / r_4' < -0.01$$

The above-mentioned formula has a negative value since the value of x is expressed taking the direction toward the image as positive. Accordingly, the inequality sign indicates the direction in which asphericality is increased.

Figure 15:
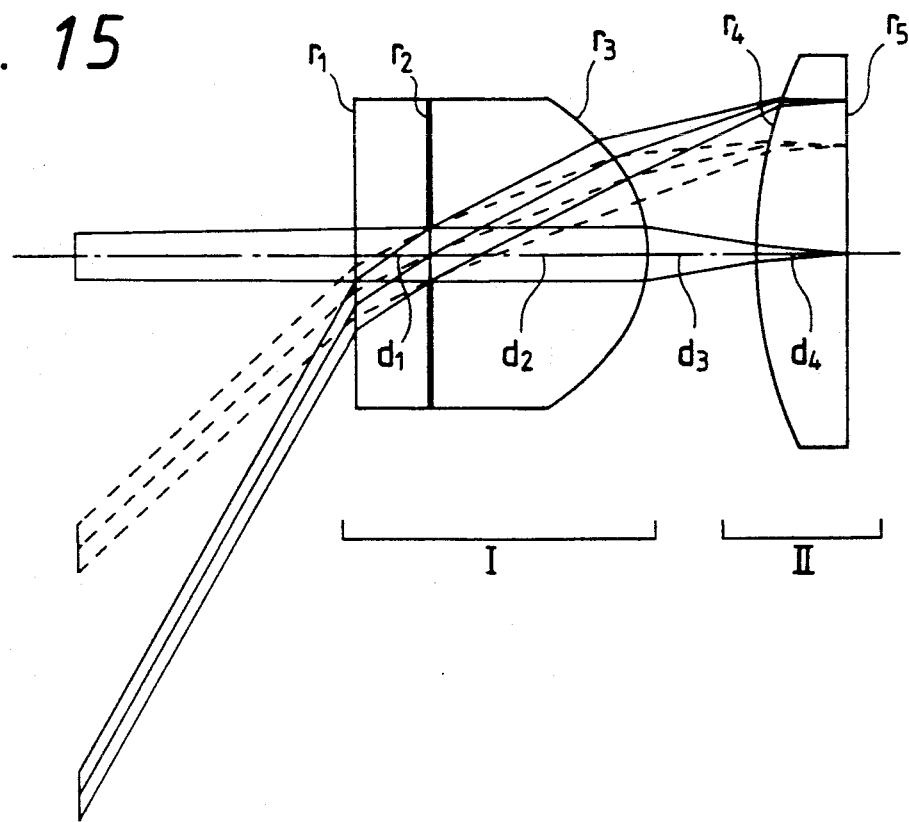
Figure 16:
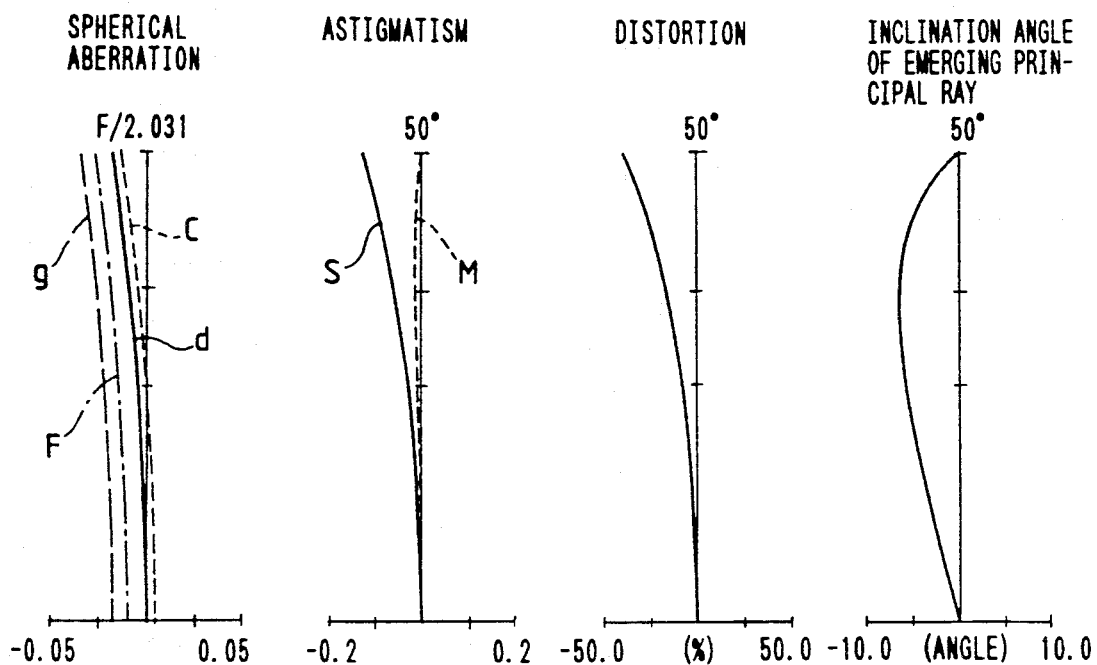
FIG. 16 through FIG. 26 show curves illustrating aberration characteristics of the Embodiments 1 through 11 respectively of the present invention.
Figure 17:
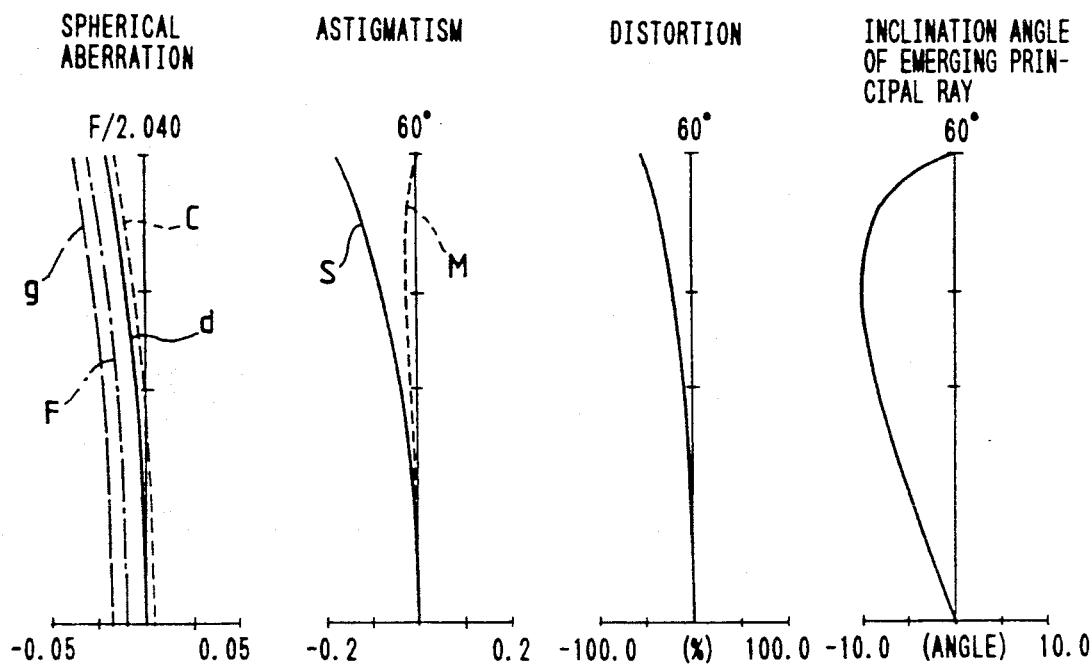
Figure 18:
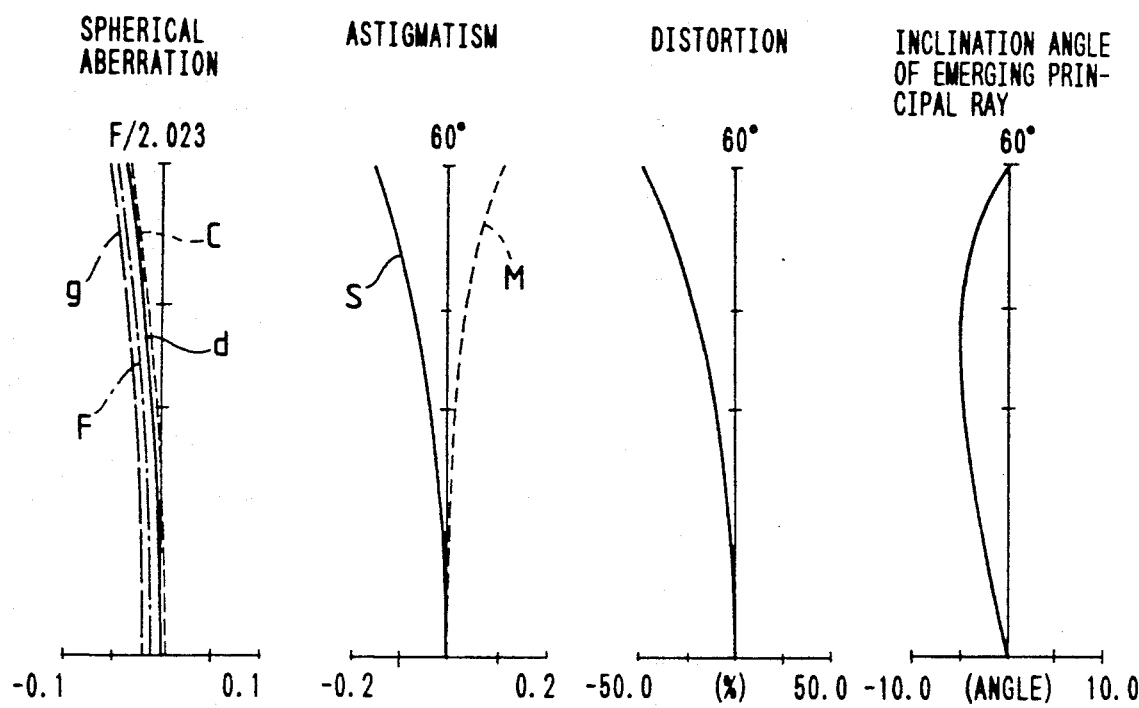
Figure 19:
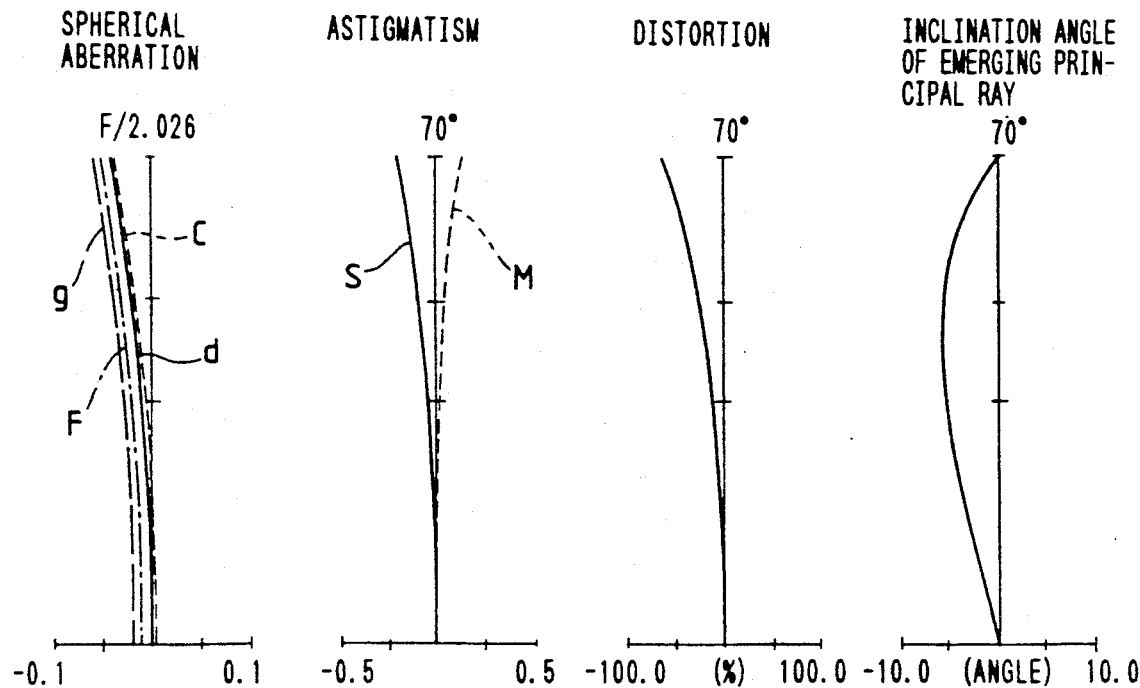
Figure 20:
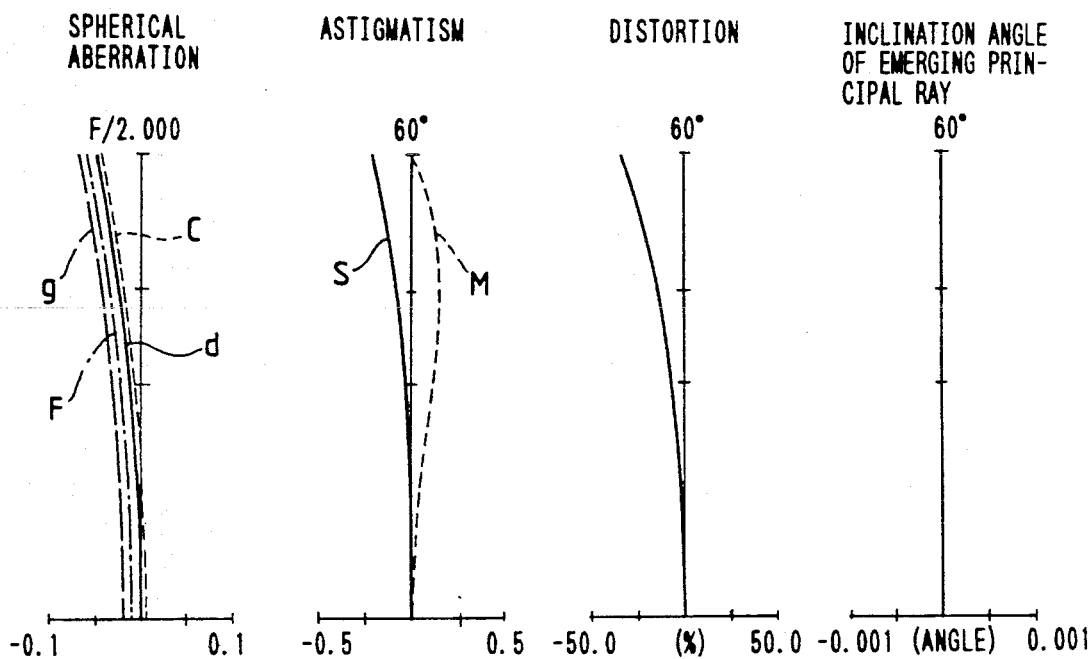
Figure 21:
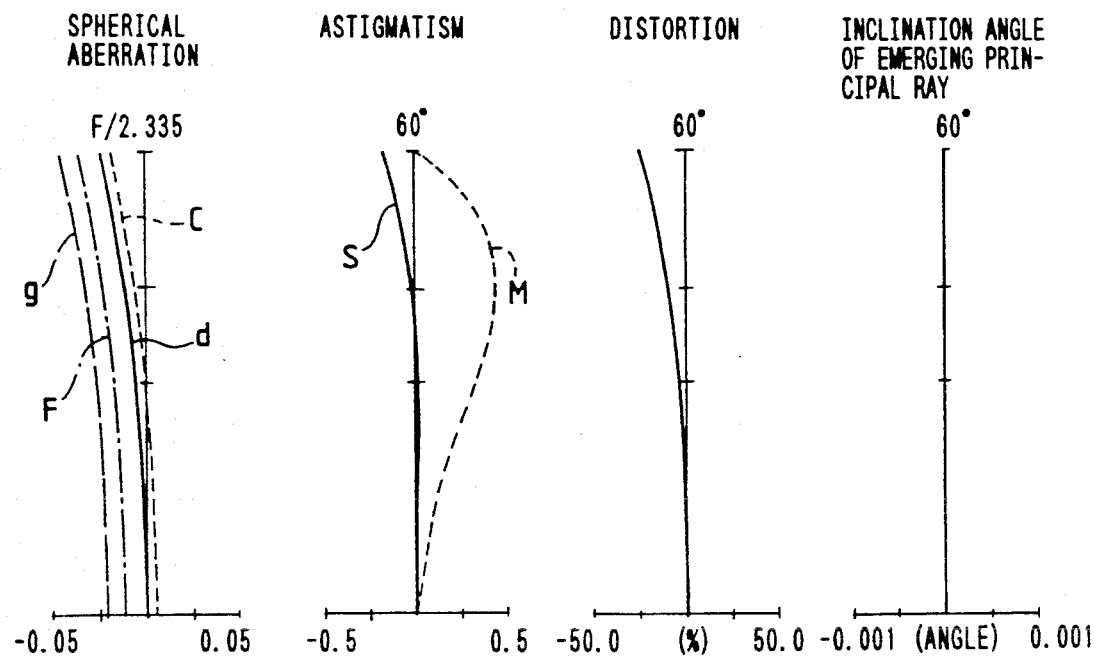
Figure 22:
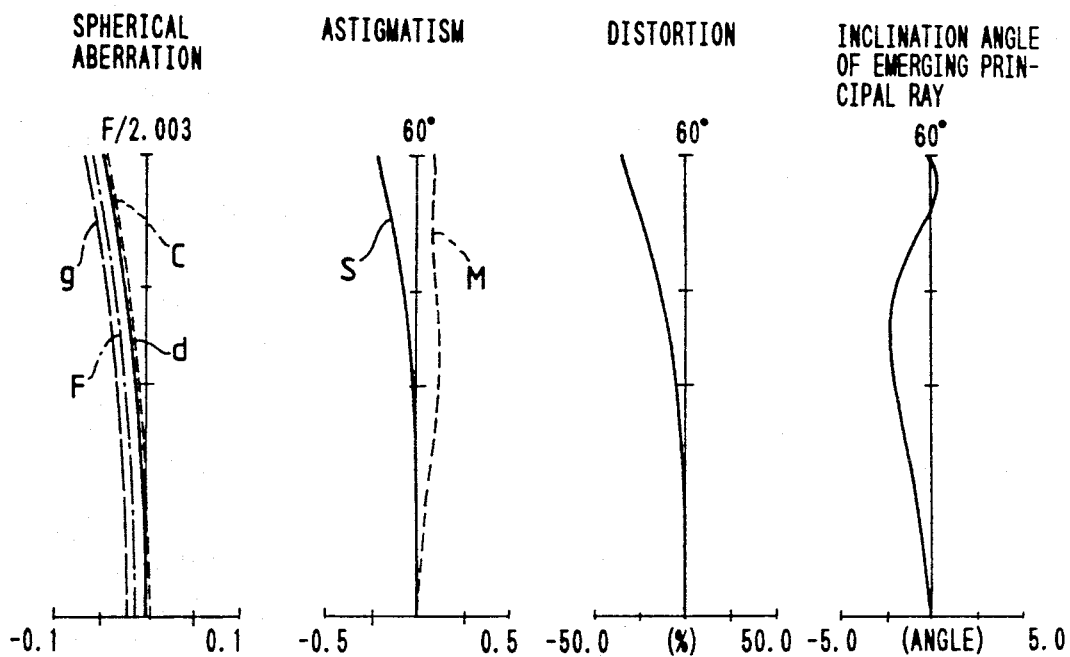
Figure 23:
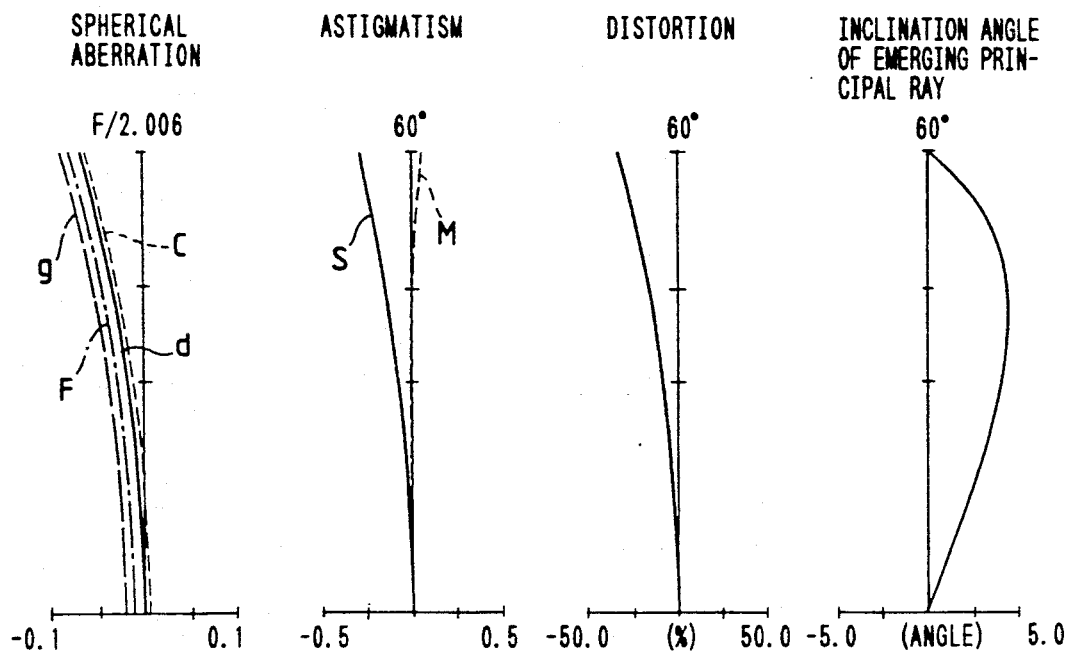
Figure 24:
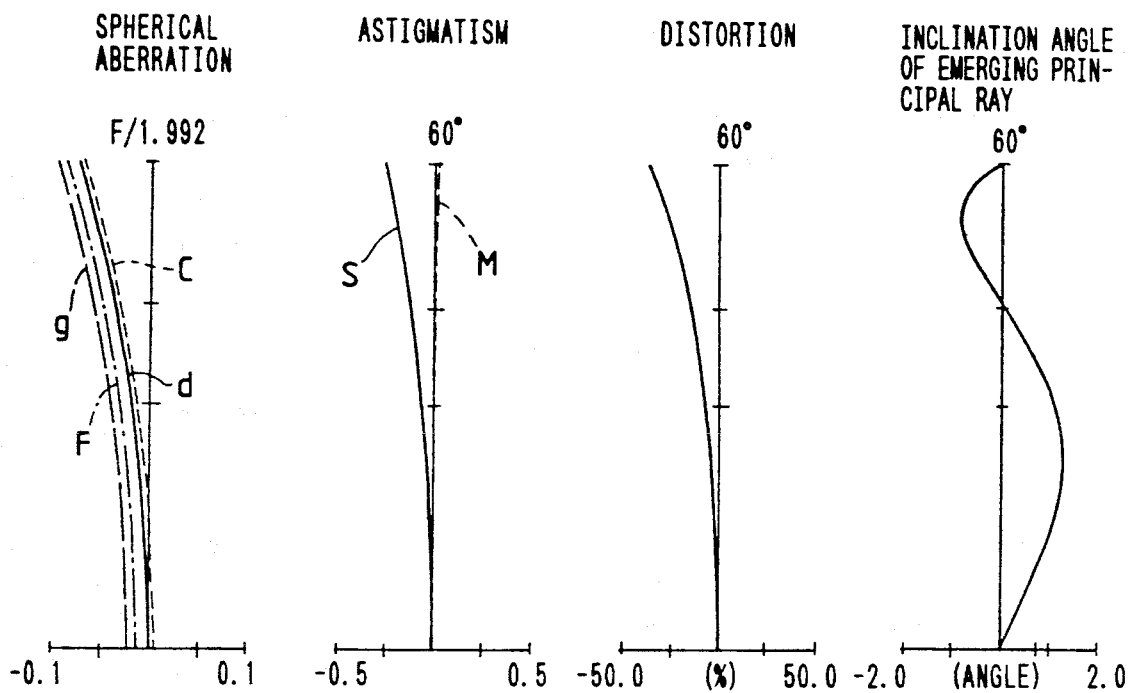
Figure 25:
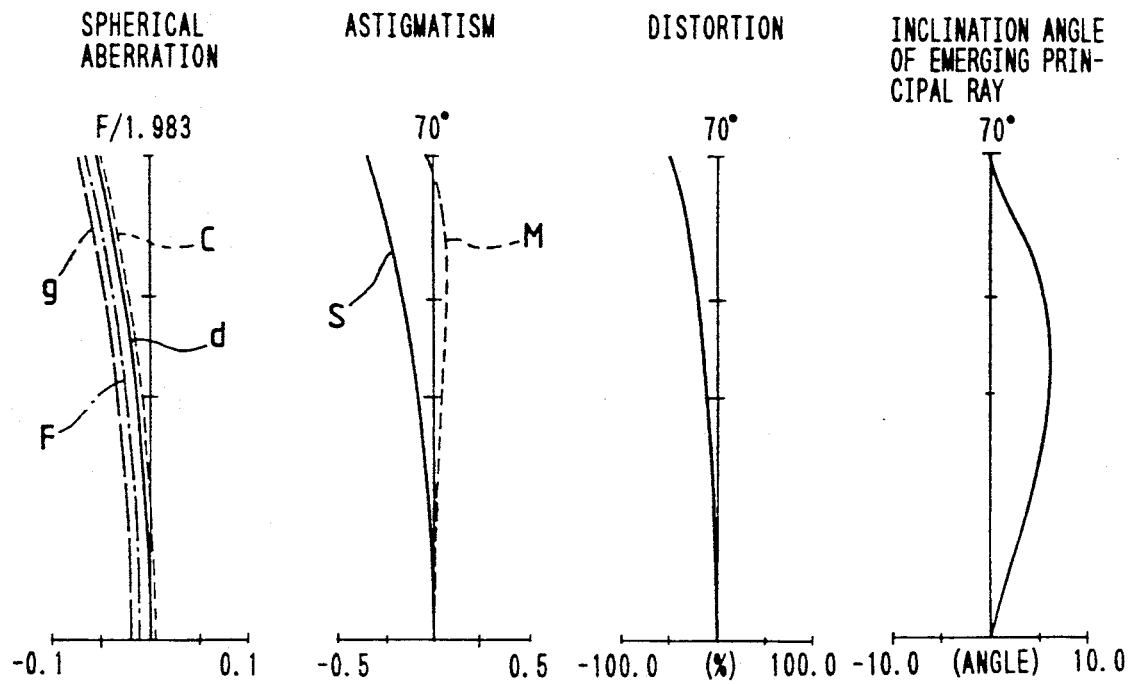
Figure 26:
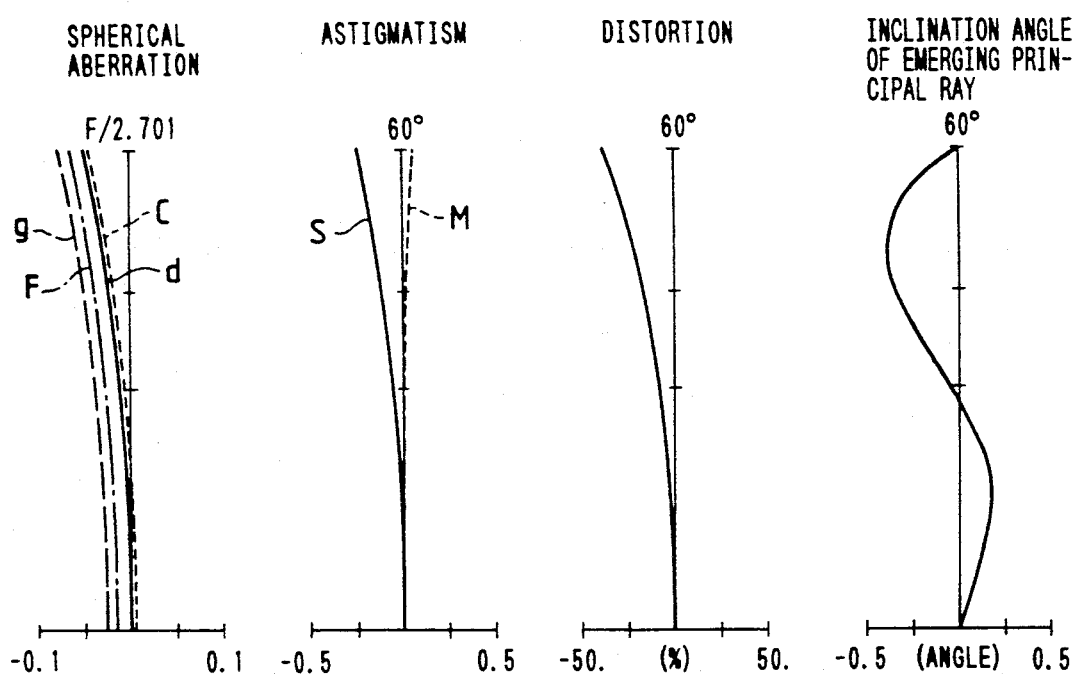

Embodiment 11 has the composition illustrated in FIG. 15 wherein only the convex surface of the first lens component adopts an aspherical surface having curvature lowered as the surface portions are father from the optical axis. Embodiment 11 is designed so as to satisfy the conditions (2'') and (3'), and has reduced distortion of $-37.9\%$ at $\omega = 60°$. In addition to the aspherical surface adopted on the first lens component, the value of $d_2 / |r_3'|$ is selected adequately within the range defined by the condition (5') so as to sufficiently reduce astigmatism and coma to be produced by the convex surface of the first lens component.

Since an aspherical surface is not adopted on second lens component, the Embodiment 11 is advantageous in that the meridional image surface is barely swollen at the intermediate image height.

Since height of the principal ray on the convex surface of the first lens component is lower than that on the convex surface of the second lens component, it is sufficient to pay attention only to the aspherical surface coefficient of the fourth order for adopting the aspherical surface on the convex surface of the first lens component. It is desirable that the aspherical surface coefficient of the fourth order of the aspherical surface to be adopted on the first lens component satisfy the following condition:

$$E_3'.f^3 > 0.01$$

Figure 4:
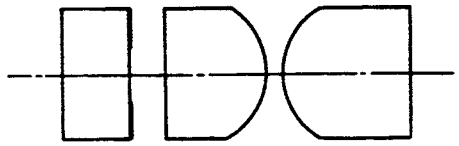
FIG. 4 shows a sectional view exemplifying a composition wherein the stop is apart from the first lens component in the objective lens system according to the present invention.
Figure 5:
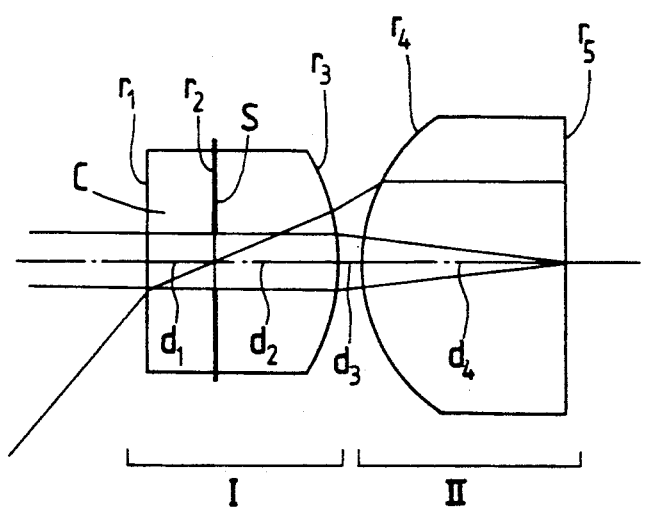
FIG. 5 through FIG. 15 show sectional views illustrating Embodiments 1 through 11 of the objective lens system according to the present invention.
Figure 6:
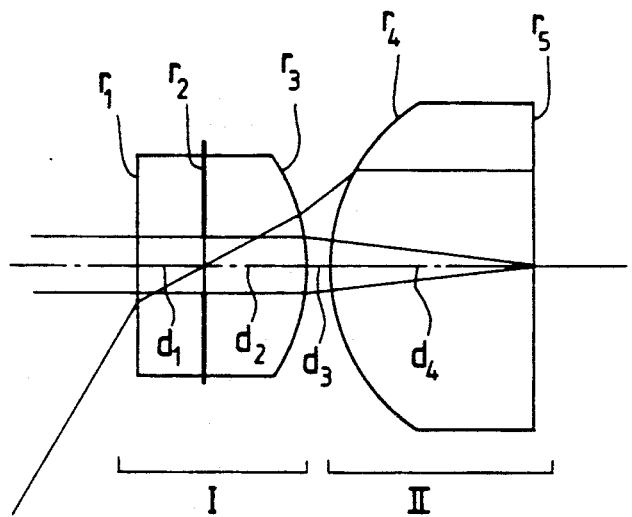
Figure 7:
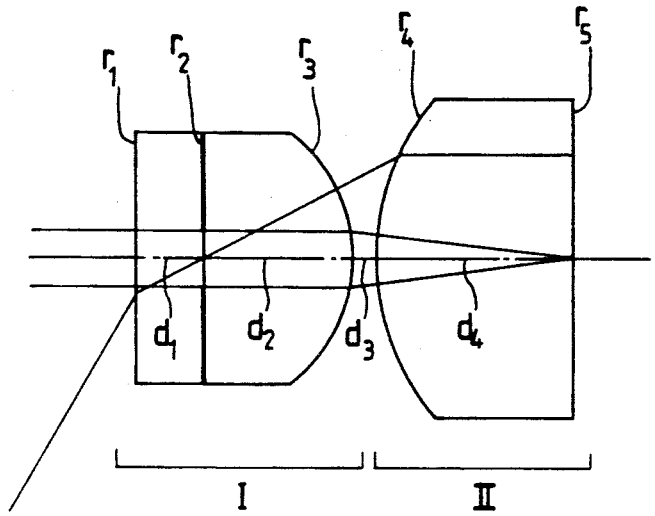
Figure 8:
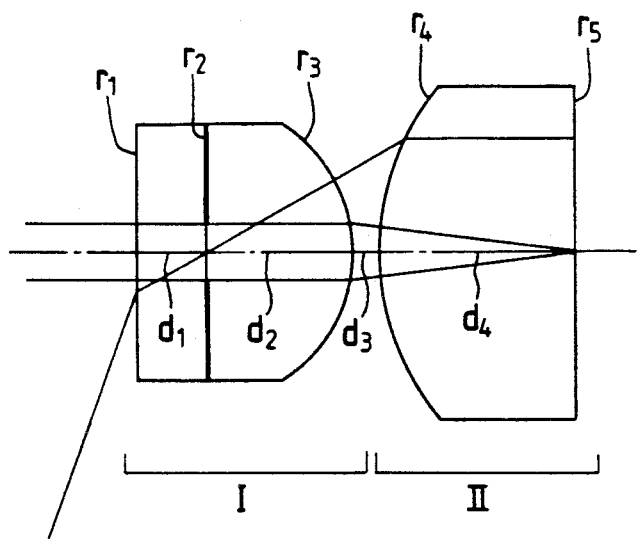

Also in a case of the objective lens system according to the present invention comprising an aspherical surface, the stop may be apart from the surface of the first lens component arranged on the side of the stop as shown in FIG. 4. In such a case, the reference symbol $d_2$ does not represent thickness of the first lens component, but designates distance as measured from the stop to the convex surface of the first lens component expressed in terms of an optical path length in a medium having the same refractive index as that of the lens component having this convex surface.

The objective lens system according to the present invention has the compositions described above, permits reducing inclination of the principal ray even at widened field angles, and is capable of correcting the aberrations of pupil and the aberrations of image with good balance.

I claim:

1. An objective lens system for endoscopes comprising, in the recited order from an object side,
   a first lens component,
   a second lens component arranged on an image side of said first lens component with an airspace interposed and an aperture stop arranged on an object side of said airspace, both of the image side surface of said first lens component and the object side surface of said second lens component being designed as spherical surfaces having positive refractive powers, and said objective lens system being designed so as to satisfy the following conditions (1) and (2):

(1) $0.21 < L/f < 0.5$ (2) $0.9 < f_2/f_1 < 3$ wherein the reference symbol L represents an optical path length as measured from a front focal point of the objective lens system as a whole to the stop, the reference symbol f designates a focal length of the objective lens system as a whole, the reference symbol $f_1$ denotes a focal length of the first lens component and the reference symbol $f_2$ represents a focal length of the second lens component.

2. An objective lens system for endoscopes according to claim 1 satisfying the following condition (3):

(3) $d_3/f < 0.4$ wherein the reference an symbol $d_3$ represents an airspace reserved between the spherical surface of the first lens component and the spherical surface of the second lens component.

3. An objective lens system for endoscopes comprising, in the recited order from an object side,
   a first lens component consisting of a plane parallel plate, an aperture stop and a lens component having an image side surface of a positive refractive power, and
   a second lens component arranged on an image side of said first lens component with an airspace interposed,
   an object side surface of said second lens component designed as an aspherical surface having a positive refractive power and including portions having a curvature progressively lowered as the portions are farther from an optical axis, no aspherical surface being arranged before said aperture stop, and an image side surface of said first lens component designed as an aspherical surface including portions having a curvature progressively lowered as the portions are farther from the optical axis.

4. An objective lens system for endoscopes according to claim 3 satisfying the following conditions (1') and (2'):

(1') $-0.5 < L/f < 0.3$ (2') $0.5 < f_2/f_1 < 3$ wherein the reference symbol L represents an optical path length as measured from a front focal point of the objective lens system as a whole to the stop, the reference symbol f designates a focal length of the objective lens system as a whole, the reference symbol $f_1$ denotes a focal length of the first lens component and the reference symbol $f_2$ represents a focal length of the second lens component.

5. An objective lens system for endoscopes according to claim 4 satisfying the following condition (5):

(5) $0.6 < d_2/|r'3| < 2$ wherein the reference symbol $d_2$ represents a thickness of the first lens component and the reference symbol $r'3$ designates a radius of curvature of a convex surface of the first lens component as measured from the optical axis.

6. An objective lens system for endoscopes according to claim 4 satisfying the following condition (b 6):

(6) $1.2 < d_2/|r'3| < 1.5$

7. An objective lens system for endoscopes according to claim 4, 5 or 6 satisfying the following two conditions:

$E_3' < 0$ $F_3' < 0$ wherein the reference symbols $E_3'$ and $F_3'$ represent aspherical surface coefficients of a fourth order and a sixth order respectively in a formula expressing a shape of the aspherical surface of the first lens component, and the reference symbol f designates a focal length of the objective lens system as a whole.

8. An objective lens system for endoscopes according to claim 7 satisfying the following condition (10):

$E_4' \cdot f^3 < -0.01$ (10)

9. An objective lens system for endoscopes according to claim 4, 5, or 6 satisfying the following condition (11):

$\Delta \times (n_4 - 1) / r_4' < -0.01$ (11)

wherein the reference symbol $\Delta \times$ represents a deviation from the aspherical surface of the second lens component at a distance $y_4 = (n_4 - 1) / r_4'$, the reference symbol $n_4$ designates a refractive index of the aspherical surface the second lens component and the reference symbol $r_4'$ denotes a radius of curvature of the aspherical surface of the second lens component located on the optical axis.

10. An objective lens system for endoscopes comprising, in the recited order from an object side,
 a first lens component consisting of a plane parallel plate, an aperture stop and a lens component having an image side surface of a positive refractive power, and
 a second lens component arranged on an image side of said first lens component with an airspace interposed,
 an object side surface of said second lens component designed as an aspherical surface having a positive refractive power and including portions having a curvature progressively lowered as the portions are farther from an optical axis, no aspherical surface being arranged before said aperture stop, and said objective lens system satisfying the following conditions (1') and (2'):

$-0.5 < L/f < 0.3$ (1')

$0.5 < f_2/f_1 < 3$ (2')

wherein the reference symbol L represents an optical path length as measured from a front focal point of the objective lens system as a whole to the stop, the reference symbol f designates a focal length of the objective lens system as a whole, the reference symbol $f_1$ denotes a focal length of the first lens component and the reference symbol $f_2$ represents a focal length of the second lens component.

11. An objective lens system for endoscopes according to claim 10 wherein said first lens component has an image side spherical surface having positive refractive power and is designed so as to satisfy the following condition (4):

$0.5 < d_2/|r_3| < 1.7$ (4)

wherein the reference symbol $d_2$ represents thickness of the first lens component and the reference symbol $r_3$ designates a radius of curvature on the extremely image side surface of an first lens component.

12. An objective lens system for endoscopes according to claim 11 satisfying the following condition (4'):

$0.8 < d_2/|r_3| < 1.15$

13. An objective lens system for endoscopes according to claim 10 or 11 satisfying the following condition:

$E_4' \cdot f^3 < -0.09$ wherein the reference symbol $E_4'$ represents an aspherical surface coefficient of a shape of the aspherical surface of the second lens component and the reference symbol f designated a focal length of the objective lens system as a whole.

14. An objective lens system for endoscopes according to claim 10, 11, or 12 satisfying the following condition (11):

$\Delta \times (n_{4-1}) / r_4' < -0.01$ (11)

wherein the reference symbol $\Delta \times$ represents a deviation from the spherical surface at $y_4 = (n_4 - 1) / r_4'$, the reference symbol $n_4$ designates a refractive index of the aspherical lens element of the second lens component and the reference symbol $r_4'$ denotes a radius of curvature on the aspherical surface of the second lens component located on the optical axis.

15. An objective lens system for endoscopes comprising, in the recited order from an object side,
 a first lens component,
 a second lens component arranged on an image side of said first lens component with an airspace interposed and an aperture stop arranged on an object side of said airspace, an image side surface of said first lens component being designed as an aspherical surface having positive refractive power and including portions having a curvature progressively lowered as the portions are farther from an optical axis, and an object side surface of said second lens component being designed as a spherical surface having positive refractive power.

16. An objective lens system for endoscopes according to claim 15 satisfying the following condition (1') and (2''):

$-0.5 < L/f < 0.3$ (1')

$$1 < f_2/f_1 < 6 \qquad (2'')$$

wherein the reference symbol L represents an optical path length as measured from a front focal point of the objective lens system as a whole to the stop, the reference symbol f designates a focal length of the objective lens system as a whole, the reference symbol $f_1$ denotes a focal length of the first lens component and the reference symbol $f_2$ represents a focal length of the second lens component.

17. An objective lens system for endoscopes according to claim 16 satisfying the following conditions (3') and (5'):

$$d_3/f > 0.3 \qquad (3')$$

$$1 < d_2/|r_3'| < 3 \qquad (5')$$

wherein the reference symbol $d_3$ represents the airspace reserved between the aspherical surface of the first lens component and the spherical surface of the second lens component, the reference symbol d2 designates a thickness of the first lens component and reference symbol $r_3{}^1$ denotes a radius of curvature of a convex surface of the first lens component as measured from the optical axis.

18. An objective lens system for endoscopes according to claim 17 wherein the image side surface of the first lens component is designed, within an effective diameter thereof, as an ellipsoid of revolution having a major axis thereof on the optical axis.

19. An objective lens system for endoscopes according to claim 16 or 17 satisfying the following condition (12):

$$E_3' f^3 > 0.01 \qquad (12)$$

wherein the reference symbol $E_3'$ represents an aspherical surface coefficient of a fourth order in a formula expressing a shape of the aspherical surface of the first lens component and the reference symbol f designates a focal length of the objective lens system as a whole.

20. An objective lens system for endoscopes according to claim 15 wherein the first lens component is designed as a cemented lens consisting, in the recited order from the object side, of a plane parallel plate and a plano-convex lens element having a convex surface on the image side with an aperture stop interposed, whereas the second lens component is designed as a single plano-convex lens element having a convex surface on the object side.

21. An objective lens system for endoscopes comprising, in the recited order from an object side,
a first lens component,
a second lens component arranged on an image side of said first lens component with an airspace interposed and an aperture stop arranged on an object side of said airspace,
said first lens component having an image side surface designed as an aspherical surface having a positive refractive power and including portions having a curvature progressively lowered as the portions are farther from an optical axis, and
said second lens component having an object side surface designed as an aspherical surface having a positive refractive power and including portions having a curvature progressively lowered as the portions are farther from the optical axis, and said objective lens system satisfying the following conditions:

$$-0.5 < L/f < 0.3 \qquad (1')$$

$$0.5 < f_2/f_1 < 3 \qquad (2')$$

$$E_3' < 0$$

$$F_3' < 0$$

$$E_4' \cdot f^3 < -0.01 \qquad (10)$$

wherein the reference symbol L represents an optical path length as measured from a front focal point of the objective lens system as a whole to the stop, the reference symbol f designates a focal length of the objective lens system as a whole, a reference symbol $f_1$ denotes a focal length of the first lens component, the reference symbol $f_2$ represents a focal length of the second lens component, the reference symbols E' and $F_3'$ designate aspherical surface coefficients of a fourth order and a sixth order respectively in a formula expressing a shape of the aspherical surface of the first lens component, and the reference symbol $E_4'$ denotes an aspherical surface coefficient of a fourth order in a formula expressing a shape of the aspherical surface of the second lens component.

22. An objective lens system for endoscopes comprising, in the recited order from an object side,
a first cemented lens component comprising a plane parallel plate, an aperture stop and a plano-convex lens element convex cemented on an image side, and
a second lens component arranged on an image side of said first lens component with an airspace interposed and designed as a plano-convex lens component having a convex surface on an object side,
said second lens component having an object side surface designed as an aspherical surface having a positive refractive power and including portions having a curvature progressively lowered as the portions are farther from an optical axis, and
said objective lens system satisfying the following conditions (1') and (2''):

$$-0.5 < L/f < 0.3 \qquad (1')$$

$$1 < f_2/f_1 < 6 \qquad (2'')$$

wherein the reference symbol L represents an optical path length as measured from the front focal point of the objective lens system as a whole to the stop, the reference symbol f designates a focal length of the objective lens system as a whole, the reference symbol $f_1$ denotes a focal length of the first lens component and the reference symbol $f_2$ represents a focal length of the second lens component.

23. An objective lens system for endoscopes according to claim 22 wherein said first lens component has an image side spherical surface having positive refractive power and is designed so as to satisfy the following condition (4):

$$0.5 < d_2/|r_3| > 1.7 \qquad (4)$$

wherein the reference symbol $d_2$ represents a thickness of the first lens component and the reference symbol $r_3$ designates a radius of curvature on an extremely image side surface of the first lens component.

24. An objective lens system for endoscopes according to claim 22 or 23 satisfying the following condition:

$$E_4'/f^3 < -0.09$$

wherein the reference symbol $E_4'$ represents the aspherical surface coefficient of the fourth order in the formula expressing the shape of the aspherical surface of the second lens component and the reference symbol f designates focal length of the objective lens system as a whole.

25. An objective lens system for endoscopes according to claim 23 wherein satisfying the following condition (4'):

$$0.8 < d_2/|r_3| < 1.15 \tag{4'}$$

26. An objective lens system for endoscopes according to claim 22, 23 or 25 satisfying the following condition 11:

$$\Delta \times (n_4 - 1) / r_4' < -0.01 \tag{11}$$

wherein the reference symbol $\Delta \times$ represents a deviation from the spherical surface at $y_4 = (n_4 - 1) / r_4'$ the reference symbol $n_4$ designates a refractive index of the aspherical lens element of the second lens component and the reference symbol $r_4'$ denotes a radius of curvature on the aspherical surface of the second lens component located on the optical axis.

27. An objective lens system according to claim 23 wherein the object side surface of the second lens component is designed as a hyperbolic surface of revolution within the effective diameter thereof.

28. An objective lens system for endoscopes comprising, in the recited order from an object side,
a first lens component,
a second lens component arranged on an image side of said first lens component with an airspace interposed and an aperture stop arranged on an object side of said airspace,
said first lens component having an image side surface designed as an aspherical surface having a positive refractive power and including portions having a curvature progressively lowered as the portions are farther from an optical axis, and
said second lens component having an object side surface designed as an aspherical surface having a positive refractive power and including portions having a curvature progressively lowered as the portions are farther from the optical axis.

29. An objective lens system for endoscopes comprising, in the recited order from an object side,
a first lens component,
a second lens component arranged on an image side of said first lens component with an airspace interposed and an aperture stop arranged on an object side of said airspace,
said first lens component having an image side surface designed as an aspherical surface having a positive refractive power and including portions having a curvature progressively lowered as the portions are farther from an optical axis, and
said second lens component having an object side surface designed as an aspherical surface having a positive refractive power and including portions having a curvature progressively lowered as the portions are farther from the optical axis, and said objective lens system satisfying the following conditions:

$$-0.5 < L/f < 0.3 \tag{1'}$$

$$0.5 < f_2/f_1 < 3 \tag{2'}$$

$$0.6 < d_2/|r_3'| < 2 \tag{5}$$

$$E_3' > 0$$

$$F_3' < 0$$

$$E_4'.f^3 < -0.01 \tag{10}$$

wherein the reference symbol L represents an optical path length as measured from a front focal point of the objective lens system as a whole to the stop, the reference symbol f designates a focal length of the objective lens system as a whole, a reference symbol $f_1$ denotes a focal length of the first lens component, the reference symbol $f_2$ represents a focal length of the second lens component, the reference symbol $d_2$ designates a thickness of the first lens component, the reference symbol $r_3'$ denotes a radius of curvature of a convex surface a first lens component as measured from the optical axis, the reference symbols $E_3'$ and $F_3'$ represent aspherical surface coefficients of a fourth order and a sixth order respectively in a formula expressing a shape of the aspherical surface of the first lens component, and the reference symbol $E_4'$ designates an aspherical surface coefficient of a fourth order in a formula expressing a shape of the aspherical surface of the second lens component.

30. An objective lens system for endoscopes comprising, in the recited order from an object side,
a first lens component,
a second lens component arranged on an image side of said first lens component with an airspace interposed and an aperture stop arranged on an object side of said airspace,
said first lens component having an image side surface designed as an aspherical surface having a positive refractive power and including portions having a curvature progressively lowered as the portions are farther from an optical axis, and
said second lens component having an object side surface designed as an aspherical surface having a positive refractive power and including portions having a curvature progressively lowered as the portions are farther from the optical axis, and said objective lens system satisfying the following conditions:

$$-0.5 < L/f < 0.3 \tag{1'}$$

$$0.5 < f/f_1 < 3 \tag{2'}$$

$$1.2 < d_2/|r_3'| < 1.5 \tag{6}$$

$$E_3' < 0$$

$$F_3' < 0$$

$$E_4'.F^3 < -0.01 \tag{10}$$

wherein the reference symbol L represents an optical path length as measured from a front focal point of the objective lens system as a whole to the stop, the reference symbol f designates a focal length of the objective lens system as a whole, a reference symbol $f_1$ denotes a focal length of the first lens component, the reference symbol $f_2$ represents a focal length of the second lens component, the reference symbol $d_2$ designates a thickness of the first lens component, the reference symbol $r'_3$ denotes a radius of curvature of a convex surface of the first lens component as measured from the optical axis, the reference symbols $E_3'$ and $F_3'$ represent aspherical surface coefficients of a fourth order and a sixth order respectively in a formula expressing a shape of the aspherical surface of the first lens component, and the reference symbol $E_4'$ designates an aspherical surface coefficient of a fourth order in the formula expressing a shape of the aspherical surface of the second lens component.

* * * * *